(12) United States Patent
Adogla et al.

(10) Patent No.: US 9,959,157 B1
(45) Date of Patent: May 1, 2018

(54) COMPUTING INSTANCE MIGRATION

(71) Applicant: Amazon Technologies, Inc., Seattle, WA (US)

(72) Inventors: Eden Grail Adogla, Seattle, WA (US); Brijesh Singh, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 14/558,691

(22) Filed: Dec. 2, 2014

(51) Int. Cl.
| | |
|---|---|
| G06F 11/07 | (2006.01) |
| G06F 17/50 | (2006.01) |
| G06F 9/48 | (2006.01) |
| G06F 9/455 | (2018.01) |

(52) U.S. Cl.
CPC ........ *G06F 11/079* (2013.01); *G06F 17/5009* (2013.01); *G06F 9/455* (2013.01); *G06F 9/4856* (2013.01)

(58) Field of Classification Search
CPC .... G06F 11/079; G06F 17/5009; G06F 9/455; G06F 9/4856
See application file for complete search history.

(56) References Cited

U.S. PATENT DOCUMENTS

| | | | | |
|---|---|---|---|---|
| 8,141,075 B1 * | 3/2012 | Chawla | ............... | G06F 9/45558 718/1 |
| 8,468,535 B1 * | 6/2013 | Keagy | ...................... | G06F 8/63 718/1 |
| 8,549,513 B2 * | 10/2013 | Vinberg | .................... | G06F 8/61 717/104 |
| 8,694,644 B2 * | 4/2014 | Chen | ...................... | G06F 9/4856 709/226 |
| 2007/0204265 A1 * | 8/2007 | Oshins | .................. | G06F 9/4856 718/1 |
| 2009/0007106 A1 * | 1/2009 | Araujo, Jr. | ................ | G06F 9/54 718/1 |
| 2009/0106409 A1 * | 4/2009 | Murata | ................. | G06F 9/5077 709/223 |
| 2009/0300606 A1 * | 12/2009 | Miller | .................. | G06F 9/4856 718/1 |
| 2010/0250744 A1 * | 9/2010 | Hadad | ................... | G06F 9/4856 709/226 |
| 2012/0054367 A1 * | 3/2012 | Ramakrishnan | ...... | G06F 9/4856 709/242 |
| 2012/0233608 A1 * | 9/2012 | Toeroe | ................ | G06F 9/45558 718/1 |

(Continued)

*Primary Examiner* — Joe Chacko
(74) *Attorney, Agent, or Firm* — Thorpe North & Western, LLP.

(57) ABSTRACT

A technology is described for identifying a destination physical host used to host a computing instance modeled on a source computing instance. An example method may include obtaining specifications for a source computing instance in preparation to migrate the source computing instance to a destination physical host. A destination physical host may then be identified for hosting a destination computing instance modeled on the source computing instance, where the destination physical host may have specifications determined to support the destination computing instance. A model of the source computing instance as hosted on the source physical host may be compared with a model of the source computing instance as hosted on the destination physical host to identify any conflicts that may prevent the destination physical host from hosting the destination computing instance.

22 Claims, 12 Drawing Sheets

(56) References Cited

U.S. PATENT DOCUMENTS

| | | | | |
|---|---|---|---|---|
| 2013/0305093 A1* | 11/2013 | Jayachandran | ..... | G06F 11/0754 |
| | | | | 714/37 |
| 2014/0157058 A1* | 6/2014 | Bennah | ............... | G06F 11/3604 |
| | | | | 714/38.1 |
| 2014/0165063 A1* | 6/2014 | Shiva | .................. | G06F 9/45533 |
| | | | | 718/1 |
| 2015/0261842 A1* | 9/2015 | Huang | .............. | G06F 17/30595 |
| | | | | 707/758 |

* cited by examiner

COMPUTING INSTANCE MIGRATION

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Occasionally, a computing instance may be moved from one physical host to another physical host. For example, due to maintenance scheduling, a computing instance may be migrated from a source physical host to a destination physical host so that maintenance may be performed on the source physical host. When migrating a computing instance, various actions may be performed. Illustratively, a new computing instance may be created on a destination physical host, local storage used by the source computing instance may be replicated and transferred to local storage located on the destination physical host, a network address for the source computing instance may be reassigned from the source computing instance to the new computing instance on the destination physical host, and lastly, the computing instance located on the source computing instance may be terminated.

DETAILED DESCRIPTION

Figure 1:
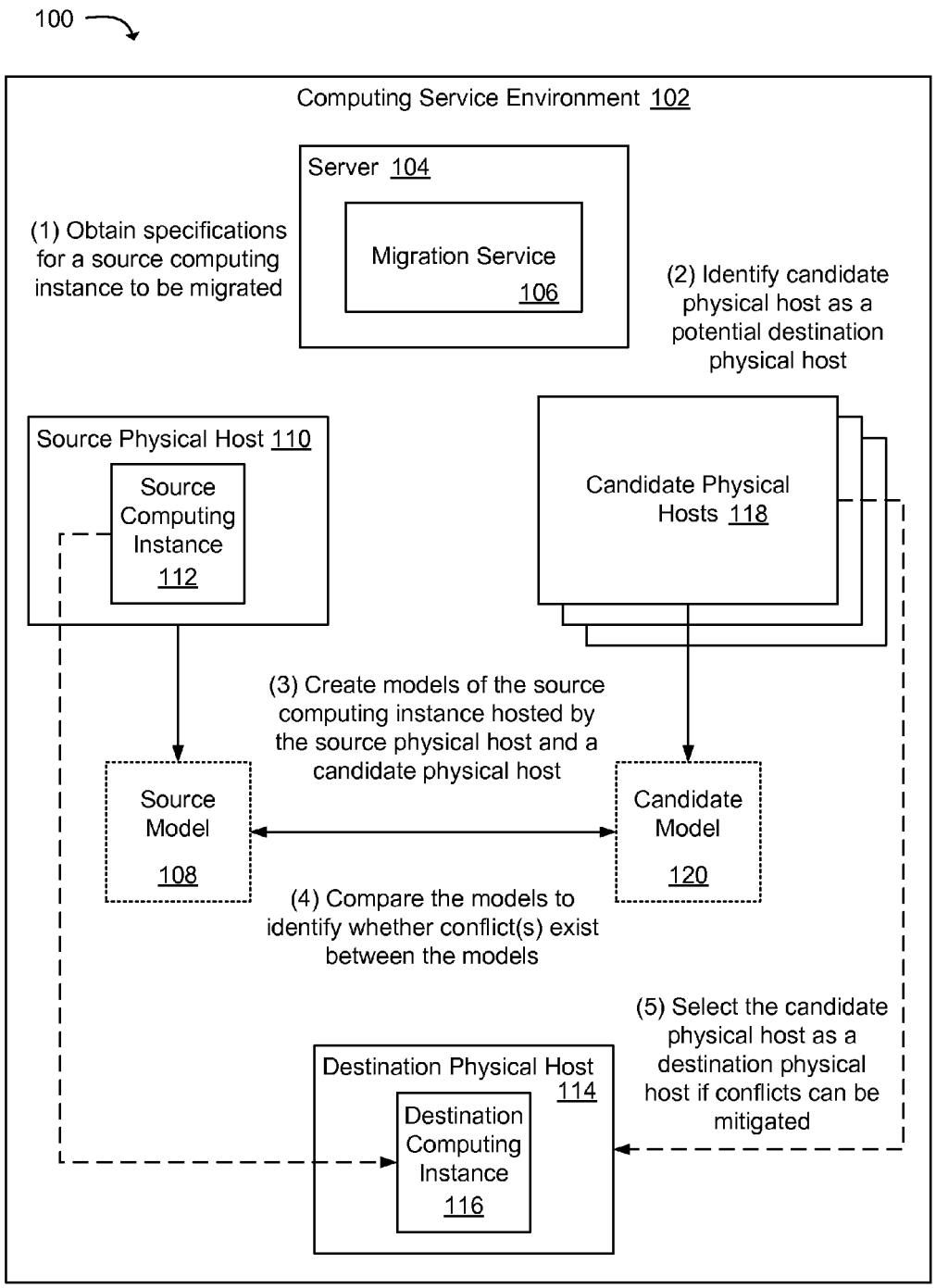
FIG. 1 is a block diagram illustrating an example system for identifying a destination physical host that may be used to host a computing instance modeled on a source computing instance.

A technology is described for identifying a destination physical host used to host a computing instance that is to be migrated from a source physical host to the destination physical host. In one example configuration, in preparation to migrate a source computing instance located on a source physical host, one or more candidate physical hosts may be identified as potential destination physical hosts for hosting a destination computing instance that has been modeled or profiled on the source computing instance regarding the resources used on the source computing instance. The candidate physical hosts may be identified as having a core feature set capable of supporting the destination computing instance modeled on the source computing instance. A core feature set may be a minimum of computing hardware resources and software resources needed to host the destination physical host.

Specifications for the source computing instance may be obtained, which may be used to construct a virtual model of the source computing instance. For example, the source computing instance may be analyzed to: determine a software configuration that comprises the source computing instance and determine computing resources (e.g., system services and hardware) utilized by the source computing instance. A virtual model (e.g., a source model) of the source computing instance as hosted on the source physical host may be constructed using the specifications for the source computing instance and specifications for the source physical host. Also, a virtual model (e.g., a candidate model) of the source computing instance as the virtual instance may be hosted on a candidate physical host may be constructed using the specifications for the source computing instance and specifications for the candidate physical host.

Having created a source model and a candidate model, a comparison of the source model with the candidate model may be performed to identify conflicts or inconsistencies between the two models. The conflicts identified may be software (e.g., services that are not provided) and/or hardware incompatibilities that could prevent the candidate physical host from hosting a destination computing instance if the conflicts cannot be mitigated (e.g., emulated) or eliminated. As referred to in this disclosure, a computing instance may be a virtual machine (e.g., an instance of a software implementation of a computer) that executes applications like a physical machine. The computing instance may be hosted by a physical host using a hypervisor, virtual machine monitor (VMM), or another type of program configured to enable the hosting of multiple computing instances.

A computing service environment may include physical hosts having various configurations of hardware and/or software. Therefore, migrating a computing instance from a source physical host to a destination physical host having a different software and/or hardware configuration than the source physical host may result in a destination computing instance not operating correctly on the destination physical host. As a result of the technology disclosed herein, a physical host may be evaluated to determine whether the physical host may be a good candidate for hosting a destination computing instance scheduled for migration. Namely, a source computing instance scheduled for migration may be modeled as being hosted on the candidate physical host prior to the migration to determine whether the candidate physical host may be capable of hosting the destination computing instance.

FIG. 1 is a diagram illustrating a high level example of a system 100 and method for identifying a destination physical host 114 that may be used to host a destination computing instance 114 modeled on a source computing instance 112. Identification of the destination physical host 114 may be made in preparation to migrate the source computing instance 112 to the destination physical host 114.

The system 100 may comprise a computing service environment 102 containing a server 104 that hosts a migration service 106 used to identify a destination physical host 114, as well as a number of physical hosts (e.g., source physical hosts 110, destination physical hosts 114 and candidate physical hosts 118) configured to host computing instances (e.g., source computing instances 112 and destination computing instances 116).

In one example configuration, in response to a request to migrate a source computing instance 112 or in anticipation of migrating a source computing instance 112, the migration service 106 may provide a destination physical host 114 and a migration workflow used to migrate the source computing instance 112 to the destination physical host 114. The migration service 106 may be configured to obtain specifications for the source computing instance 112 to be migrated. The specifications may include a software configuration of the source computing instance 112 and a model of the specifications for computing resources (e.g., hardware and system services) that the source computing instance 112 utilizes on the source physical host 110. The software configuration of the source computing instance 112 may be a software stack that includes an operating system, an operating system kernel, applications, virtualized firmware, drivers as well as other software that may be used by the source computing instance 112.

In one example, a hypervisor or a virtual machine monitor may be queried to obtain the specifications of a source computing instance 112. In another example, a database containing specifications of source computing instances 112 may be queried to obtain the specifications. And in another example, software agents located on a source physical host 110 or software agents executing on a source computing instance 112 may provide specifications for an associated source computing instance 112.

Having obtained specifications for the source computing instance 112, one or more candidate physical hosts 118 may be identified, one of which may be selected as a destination physical host 114. In one example, specifications for the source computing instance 112 may be used to identify the candidate physical hosts 118 by identifying candidate physical hosts 118 having the specifications of the source computing instance 112. For example, the specifications for the source computing instance 112 may include a core feature set of hardware and/or software used by the source computing instance 112, including, but not limited to: hardware architecture (e.g., processors, memory, storage), operating software (e.g., kernel, operating system, hypervisor, services, drivers, etc.), services, firmware, network architecture, or other hardware and software specifications.

Alternatively, specifications for a source physical host 110 may be used to identify candidate physical hosts 118 having similar specifications. Source physical host 110 specifications may be obtained by querying a source physical host 110 directly, querying a physical host manager or by using some other method. The specifications (e.g., a core feature set) of the source physical host 110 may then be used to identify one or more candidate physical hosts 118 having the core feature set.

From the candidate physical hosts 118 identified, a candidate physical host 118 may be selected and a determination may be made whether the candidate physical host 118 may be capable of hosting a destination computing instance 116. In one example, a candidate physical host 118 having specifications that most closely match the specifications of a source physical host 110 may be selected from a group of candidate physical hosts 118. In a case where a determination may be made that the candidate physical host 118 selected is not capable of hosting a destination computing instance 116, another candidate physical host 118 may be selected from the group of candidate physical hosts 118.

Illustratively, a group of candidate physical hosts 118 may be ranked according to specifications for the candidate physical hosts 118, where a top ranked candidate physical host 118 may have specifications that most closely match specifications of the source physical host 110 as compared to other ranked candidate physical hosts 118. In a case where a candidate physical host 118 selected may be invalidated as being able to host a destination computing instance 116, a candidate physical host 118 that next most closely matches the specifications of the source physical host 110, or is next top ranked may be selected.

After selecting a candidate physical host 118, a source model 108 and a candidate model 120 may be generated. The candidate model 120 may be a virtual model of the source computing instance 112 specifications as hosted on a candidate physical host 118. The source model 108 may be a virtual model of the source computing instance 112 specifications as hosted on the source physical host 110. The source model 108 and the candidate model 120 may be constructed to determine what features (i.e., hardware and software) of a source physical host 110 and a destination physical host 114 may be utilized by a source computing instance 112.

The source model 108 may then be compared with the candidate model 120 to determine whether conflicts exist between the source model 108 and the candidate model 120. For example, features of the source model 108 may be compared with features of the candidate model 120 to determine whether any conflicts between the features exist that may result in invalidating the candidate physical host 118 from hosting the destination computing instance 116.

As an illustration, features of the source model 108 and the candidate model 120 may include types and versions of hardware and software utilized by the source computing instance 112 defining the source model 108 and the candidate model 120. The features for the source model 108 and the candidate model 120 may be compared to identify conflicts between the features that may result in the source computing instance 112 operating incorrectly on the candidate physical host 118. As a specific example, a comparison of the features may show that the source model 108 includes a system service used by the source computing instance 112 that may not be included in the candidate model 120. Or as another specific example, a comparison of the features may show that a version of a system service used by the source computing instance 112 may not be included in the candidate model 120. Accordingly, due to the conflict (e.g., the absence of the system service or system service version), the candidate physical host 118, in some cases, may be invalidated as a candidate to host the destination computing instance 116.

In one example configuration, after determining that one or more conflicts exist between the source model 108 and the candidate model 120, a filter may be applied that identifies conflicts between the source model 108 and the candidate model 120 that may not qualify as conflicts preventing the candidate physical host 118 from hosting the destination computing instance 116. For example, some conflicts between a source model 108 and a candidate model 120 may be inconsequential to a candidate physical host 118 being selected as a destination physical host 114. As a specific example, a version of a hypervisor executing on a candidate physical host 118 may be a different version of a hypervisor executing on a source physical host 110. Although the hypervisor versions may not be identical, the source computing instance 112 may function equally well on either version of the hypervisor, making the hypervisor conflict inconsequential.

The filter applied to conflicts between a source model 108 and a candidate model 120 may reference a list or a database of conflict resolutions. Conflicts discovered as a result of comparing a source model 108 and a candidate model 120 may be provided to the filter, which may then attempt to identify conflict resolutions for the conflicts. Those conflicts that are determined to be inconsequential may then be eliminated. In the case that the conflicts may be resolved, then the candidate physical host 118 may be selected as the destination physical host 114 and a source computing instance 112 may be migrated to the destination physical host 114. Namely, a destination computing instance 116 modeled on the source computing instance 112 (e.g., creating the destination computing instance 116 using the machine image used to create the source computing instance 112) may be created on the destination physical host 114.

In another example configuration, a conflict between a source model 108 and a candidate model 120 that may not be inconsequential may be mitigated by modifying a destination computing instance 116 to utilize the computing resources of a candidate physical host 118. For example, a source computing instance 112 may be analyzed to determine whether the source computing instance 112 can be modified to use the hardware and/or software of the candidate physical host 118. In the case where the source computing instance 112 can be modified, the candidate physical host 118 may be selected as the destination physical host 114 and a destination computing instance 116 modeled on the source computing instance 112 may be modified to use the computing resources of the destination physical host 114.

In another example configuration, a conflict between a source model 108 and a candidate model 120 that may not be inconsequential may be mitigated by emulating computing resources used by a source computing instance 112 on a candidate physical host 118. For example, a candidate physical host 118 may be analyzed to determine whether emulation of hardware and/or software utilized by a source computing instance 112 may be performed on the candidate physical host 118. In the case where the computing resources can be emulated on the candidate physical host 118, the candidate physical host 118 may be selected as the destination physical host 114. Additional examples of modifying a destination computing instance 116 to utilize computing resources of a destination physical host 114 and emulating computing resources on a destination physical host 114 are provided in reference to FIG. 5 and FIG. 6.

In a case where conflicts between a source model 108 and a candidate model 120 cannot be mitigated (e.g., by way of modifying a destination computing instance 116 or emulating computing resources), the candidate physical host 118 upon which the candidate model 120 is constructed may be invalidated as a candidate for the destination physical host 114. Accordingly, a second candidate physical host 118 may be selected and a second candidate model 120 may be constructed using specifications of the second candidate physical host 118, as described above. The process of selecting a candidate physical host 118 and constructing a candidate model 120 may be repeated until a candidate physical host 118 capable of hosting a destination computing instance 116 may be identified.

In another example configuration, costs associated with pre-migration transforms (i.e., modifications and emulations in preparation of a computing instance migration), in some examples, may be determined and compared. A pre-migration transform having the lowest cost may be selected and performed. Costs associated with pre-migration transforms may include costs associated with a time to perform a pre-migration transform, costs associated with computing resource utilization to perform a pre-migration transform, costs related to purchasing computing hardware, costs associated with software development and administrative tasks, as well as other costs.

In another example configuration, periodic audits of a computing service environment may be performed to identify and inventory specifications for computing instances included in the computing service environment 102. In cases where specifications for a computing instance have been modified, the change may be noted for migration purposes and a computing service provider may be notified that the specifications for the computing instance have been modified.

In another example configuration, introspection techniques may be used to identify computing resources (e.g., system services) that may be used by a source computing instance 112. Based in part on the computing resources identified, candidate physical hosts 118 having the computing resources may be identified as potential destination physical hosts 114. As one example, call tracing may be used to identify computing resources that a source computing instance 112 makes calls to (e.g., API (Application Programming Interface) calls, procedure calls, other network commands, or other service type calls). As another example, software agents executing on a source computing instance 112 may monitor resources used by the source computing instance 112 and report back to a monitoring service that may manage a record of services used by the source computing instance 112.

In another example configuration where a migration of a source computing instance 112 includes modifying computing resources of a destination physical host 114 and/or a destination computing instance 116, the status of the source computing instance 112 scheduled for migration may be monitored to determine whether the source computing instance 112 has been terminated before the migration process can be performed. In the case that the source computing instance 112 is terminated prior to migration, performance of any modifications to the destination physical host 114 and/or the destination computing instance 116 may be cancelled. As a result, resources may not needlessly be expended to prepare for a computing instance migration that will not take place.

In yet another example configuration, when preparing to migrate a source computing instance 112 to a destination physical host 114, the configuration of the source computing instance 112 may be analyzed to determine whether features of the configuration should be included in the destination computing instance 116 as is, in a modified form, in an emulated form or whether the features should be made unavailable to the destination computing instance 116. In one example, a determination of whether to include a feature of a source computing instance 112 configuration in a destination computing instance 116 may be based in part on whether the configuration feature poses a potential security threat to a computing service environment 102.

Figure 2:
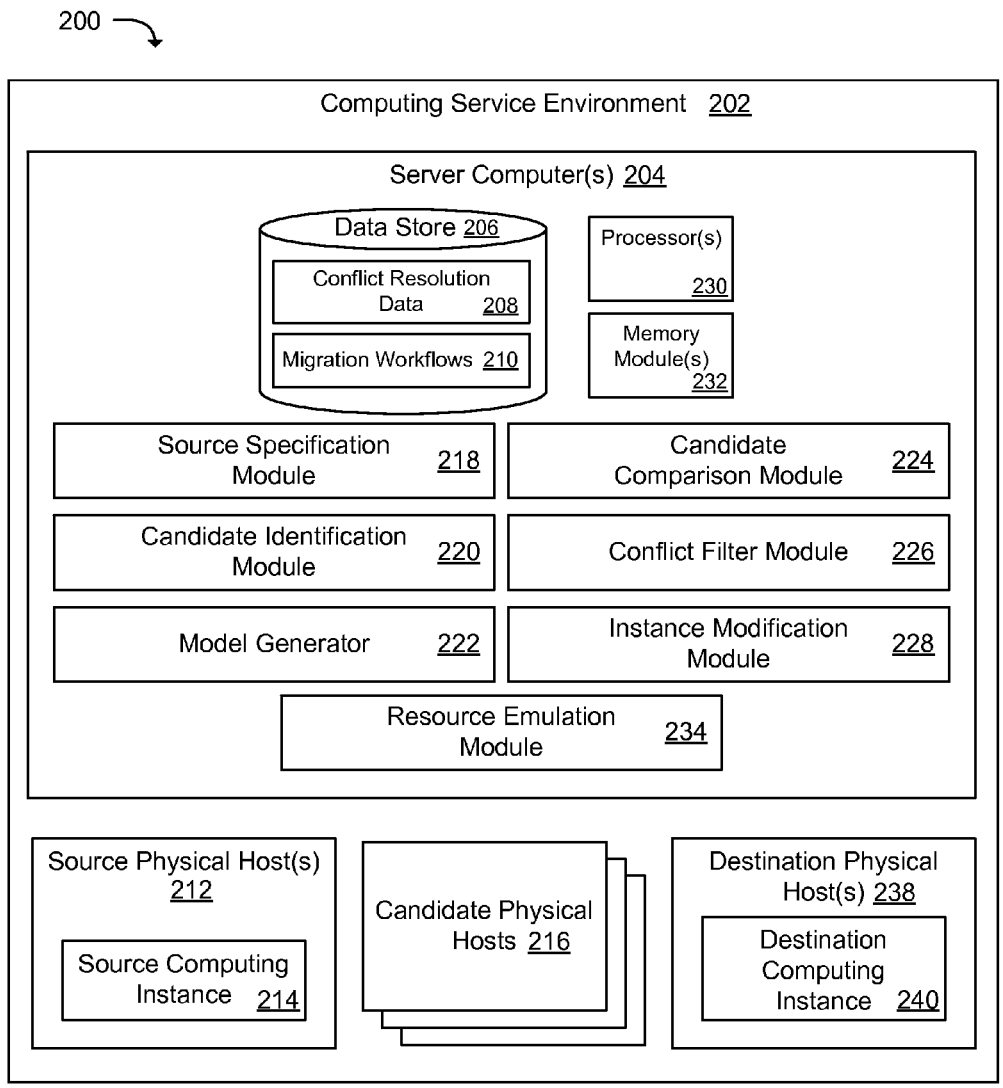
FIG. 2 is a block diagram that illustrates various example components included in a system for identifying a destination physical host used to host a destination computing instance.

FIG. 2 illustrates components of an example system 200 on which the present technology may be executed. The system 200 may include a computing service environment 202 that provides computing services by way of computing instances hosted by one or more physical hosts. Included in the computing service environment 202 may be a server computer 204 containing a number of modules used as part of a migration service that identifies a candidate physical host 216 that may be selected as a destination physical host 238.

As illustrated, the server computer 204 may include a source specification module 218 configured to determine specifications for a source computing instance 214 (i.e., source computing instance specifications) hosted by a source physical host 212 in preparation to migrate the source computing instance 214 to a destination physical host 238. Also, the source specification module 218 may be configured to determine specifications for the source physical host 212 (i.e., source physical host specifications) that hosts the source computing instance 214. The specifications for the source computing instance 214 and the specifications for the source physical host 212 may be used to generate a source model of the computing instance 214 as hosted on the source physical host 212, and specifications for the source computing instance 214 and specifications for the candidate physical host 216 (i.e., candidate physical host specifications) may be used to generate a candidate model of the computing instance 214 as hosted on a candidate physical host 216.

A candidate identification module 220 may be configured to identify one or more candidate physical hosts 216 as potential destination physical host candidates. Specifications for a source physical host 212 and/or specifications for a source computing instance 214 may be used to identify the candidate physical hosts 216. For example, the specifications may be used to identify candidate physical hosts 216 having the same or similar specifications associated with the source computing instance 214 and/or the source physical host 212.

After obtaining specifications for the source computing instance 214 and identifying at least one candidate physical host 216, a model generator 222 may be used to construct a source model and a candidate model that represent the source computing instance 214 as hosted on the source physical host 212 and the source computing instance 214 as hosted on a candidate physical host 216 respectively. Illustratively, the source model and the candidate model may be computer simulations providing data points that may be compared to identify conflicts between the source model and the candidate model. As such, the source model may represent a template that the candidate model may be compared against.

A candidate comparison module 224 may be configured to identify conflicts between the source model and the candidate model by comparing the candidate model to the source model. Differences between the source model and the candidate model may indicate a conflict that may prevent the candidate physical host 216 represented by the source model from hosting a destination computing instance 240.

To determine whether conflicts identified by the candidate comparison module 224 may result in the disqualification of a candidate physical host 216 associated with a candidate model, the conflicts may be provided to a conflict filter module 226 that may be configured to identify conflicts that do not prevent the candidate physical host 216 from being selected as the destination physical host 238. For example, the conflict filter module 226 may be configured to query a data store 206 for conflict resolution data 208, which may be used to determine whether a conflict may be resolved. Illustratively, the conflict resolution data 208 may include a set of conflicts that have been identified as inconsequential to hosting a destination computing instance 240 on the candidate physical host 216. As a specific example, a conflict identified between a source model and a candidate model may be different in versions of a system service utilized by the source computing instance 214. Referencing the conflict resolution data 208 may reveal that the version difference in the system services may be inconsequential such that a destination computing instance 240 may perform properly using either version of the system service.

In cases where a conflict is unable to be resolved using the conflict filter module 226, a determination may be made whether a modification to a destination computing instance 240 may be made resulting in the candidate physical host 216 being selected as the destination physical host 238. For example, an instance modification module 228 may be configured to clone (e.g., replicate) a source computing instance 214 and perform one or more modifications to the cloned computing instance that enable the cloned computing instance to use the computing resources of a destination physical host 238. The cloned computing instance may then be transferred to the destination physical host 238 as the destination computing instance 240. Alternatively, a candidate physical host 216 selected as the destination physical host 238 may be instructed to create a destination computing instance 240 by cloning the source computing instance 214. The destination computing instance 240 may then be modified to use the computing resources of the destination physical host 238.

Further, in cases where a conflict is unable to be resolved using the conflict filter module 226, a determination may be made that emulating hardware or software used by a source computing instance 214 on a candidate physical host 216 may result in the candidate physical host 216 being selected as the destination physical host 238. A resource emulation module 234 may be configured to identify hardware emulations and/or software emulations that may be installed on a candidate physical host 216, making the candidate physical host 216 eligible to host a destination computing instance 240. For example, a computing resource used by a source computing instance 214 that may not be available on a candidate physical host 216 may be identified. The resource emulation module 234 may be configured to then determine whether emulation software for the computing resource may be available, and instruct the candidate physical host 216 to install the emulation software on itself (i.e., the candidate physical host 216), qualifying the candidate physical host 216 to be selected as the destination physical host 238.

In cases where a modification of a destination computing instance 240 and/or emulation of a computing resource on a destination physical host 238 results in a candidate physical host being selected as the destination physical host 238, a migration workflow 210 for the migration of a respective source computing instance 214 may be updated to reflect the modifications performed and/or the emulations used to migrate the source computing instance 214. Thus, when future migrations of the source computing instance 214 (i.e., computing instances having the specifications of the source computing instance 214) may be performed, the migration workflow 210 for the source computing instance 214 may be used again.

Communication between the server computer 204 and various physical hosts included in the system 200 may be performed using API calls, procedure calls or other network commands according to different technologies, including, but not limited to, Representational State Transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The various processes and/or other functionality contained within the system 200 may be executed on one or more processors 230 that are in communication with one or more memory modules 232. The system 200 may include a number of server computers 204 that are arranged, for example, in one or more server banks or computer banks or other arrangements. For purposes of convenience, the server computer 204 is referred to in the singular, it is understood that a plurality of server computers 204 may be employed in the various arrangements as described above. The server computer 204 may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 206 may include storage systems such as a SAN (Storage Area Network), cloud storage network, volatile or non-volatile RAM, optical media, or hard-drive type media. The data store 206 may be representative of a plurality of data stores as can be appreciated.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system 200 that may implement the techniques above, many other similar or different environments are possible. The example environments discussed and illustrated above are merely representative and not limiting.

Figure 3:
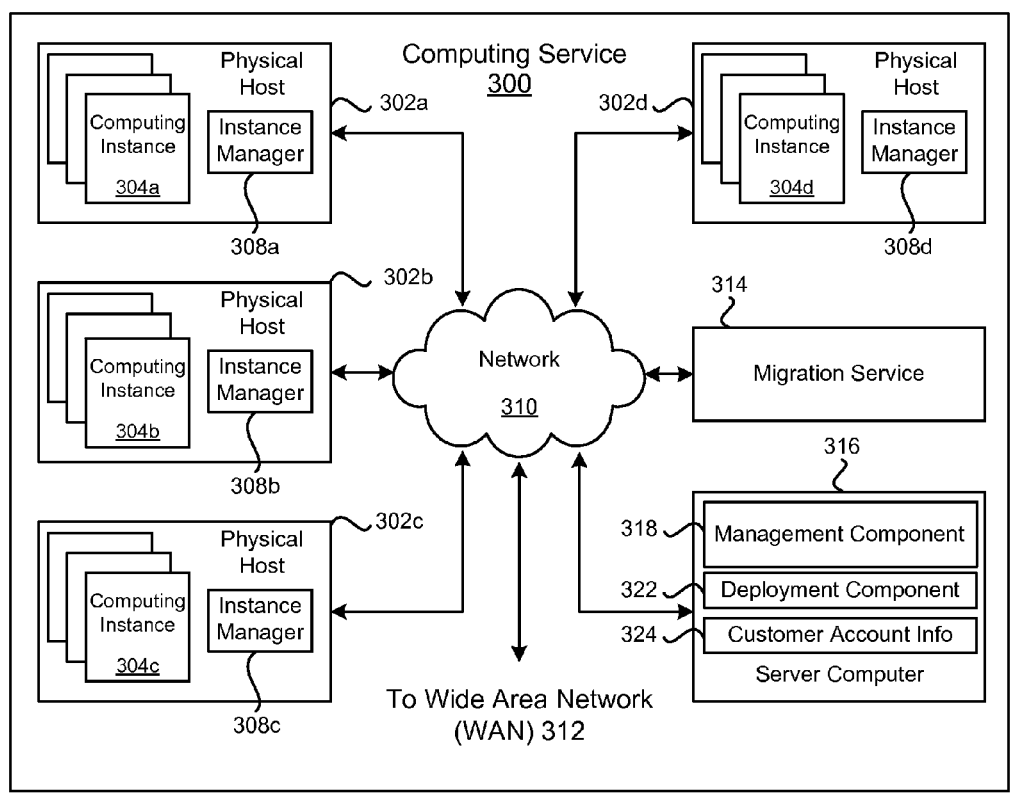
FIG. 3 is a block diagram that illustrates an example computing service environment that includes a migration service.

FIG. 3 is a block diagram illustrating an example computing service 300 that may be used to execute and manage a number of computing instances 304*a-d*. In particular, the computing service 300 depicted illustrates one environment in which the technology described herein may be used. The computing service 300 may be one type of environment that includes various virtualized service resources that may be used, for instance, to host computing instances 304*a-d*.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked customer devices, such as desktop computers, laptops, tablets, smartphones, etc running web browsers or other lightweight customer applications, for example. Those familiar with the art will recognize that the computing service 300 may be described as a "cloud" environment.

The particularly illustrated computing service 300 may include a plurality of server computers 302*a-d*. While four server computers are shown, any number may be used, and large data centers may include thousands of server computers. The computing service 300 may provide computing resources for executing computing instances 304*a-d*. Computing instances 304*a-d* may, for example, be virtual machines. A virtual machine may be an instance of a software implementation of a machine (i.e. a computer) that executes applications like a physical machine. In the example of a virtual machine, each of the server computers 302*a-d* may be configured to execute an instance manager 308*a-d* capable of executing the instances. The instance manager 308*a-d* may be a hypervisor, virtual machine monitor (VMM), or another type of program configured to enable the execution of multiple computing instances 304*a-d* on a single server. Additionally, each of the computing instances 304*a-d* may be configured to execute one or more applications.

One or more server computers 314 and 316 may be reserved to execute software components for managing the operation of the computing service 300 and the computing instances 304*a-d*. For example, a server computer 314 may execute a migration service that among other things identifies a physical host 302*a-d* that may be capable of hosting a computing instance as a result of a computing instance migration.

A server computer 316 may execute a management component 318. A customer may access the management component 318 to configure various aspects of the operation of the computing instances 304*a-d* purchased by a customer. For example, the customer may setup computing instances 304*a-d* and make changes to the configuration of the computing instances 304*a-d*.

A deployment component 322 may be used to assist customers in the deployment of computing instances 304*a-d*. The deployment component 322 may have access to account information associated with the computing instances 304*a-d*, such as the name of an owner of the account, credit card information, country of the owner, etc. The deployment component 322 may receive a configuration from a customer that includes data describing how computing instances 304*a-d* may be configured. For example, the configuration may include an operating system, provide one or more applications to be installed in computing instances 304*a-d*, provide scripts and/or other types of code to be executed for configuring computing instances 304*a-d*, provide cache logic specifying how an application cache should be prepared, and other types of information. The deployment component 322 may utilize the customer-provided configuration and cache logic to configure, prime, and launch computing instances 304*a-d*. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302*a-d*, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
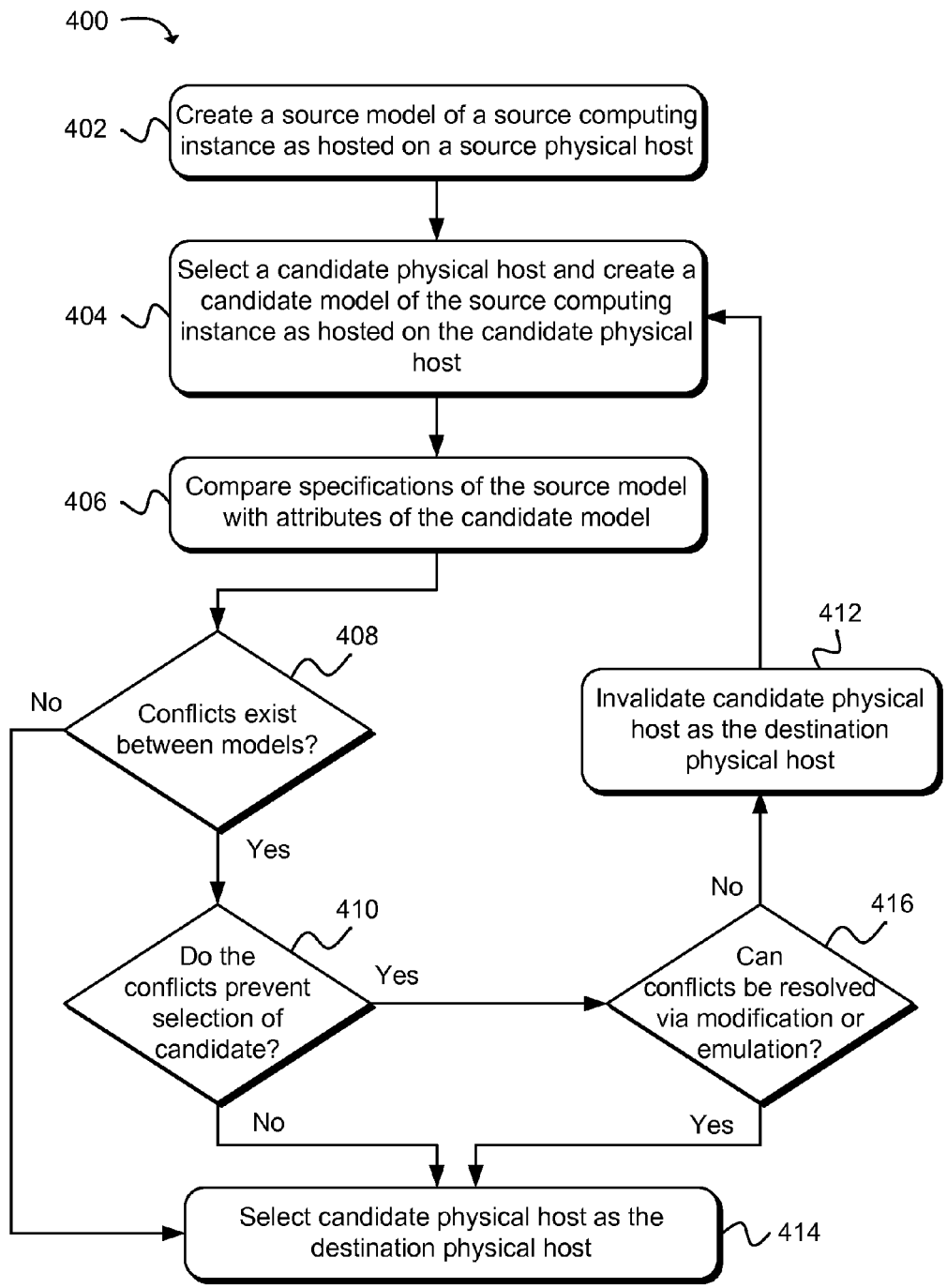
FIG. 4 is a flow diagram illustrating an example method for selecting a destination physical host for a migration of a source computing instance.

Moving now to FIG. 4, a flow diagram illustrates an example method 400 for selecting a destination physical host for a migration of a source computing instance. The method 400 may be performed upon receiving a request to migrate a source computing instance or in anticipation of scheduling a migration of the source computing instance. Starting in block 402, a source model for a source computing instance as hosted on a source physical host may be constructed. The source model may provide specifications for the source computing instance on the source physical host. The source model may show computing resources of the source physical host that may be used by the source computing instance.

As in block 404, a candidate physical host may be selected and a candidate model may be constructed. The candidate model may be for the source computing instance as hosted on the candidate physical host. The candidate model may provide specifications for the source computing instance and/or the candidate physical host. Further, the candidate model may show which computing resources of the candidate physical host may be used by the source computing instance.

After creating the source model and the candidate model, as in block 406, specifications for the source model and the candidate model may be compared to determine whether conflicts exist between the two models, as in block 408. Illustratively, comparing specifications for the source model and the candidate model may reveal incompatibilities between the source computing instance and a candidate physical host and/or an absence of computing resources used by the source computing instance on the candidate physical host.

In a case where no conflicts exist between the source model and the candidate model, the candidate physical host may be selected as the destination physical host for migrating the source computing instance, as in block 414. In a case where one or more conflicts do exist between the source model and the candidate model, as in block 410, a determination may be made whether the one or more conflicts prevent the selection of the candidate physical host as the destination physical host. For example, a determination may be made that a conflict can be mitigated by modifying a destination computing instance modeled on the source computing instance and/or by emulating a computing resource included on the source physical host on the candidate physical host, as in block 416.

In a case where the one or more conflicts do not prevent the selection of the candidate physical host, as in block 414, the candidate physical host may be selected as the destination physical host used to migrate the source computing instance. In a case where a the one or more conflicts do prevent the selection of the candidate physical host as the destination physical host, then as in block 412, the candidate physical host may be invalidated as a potential destination physical host, whereupon another candidate physical host may be selected as a potential destination physical host.

Figure 5:
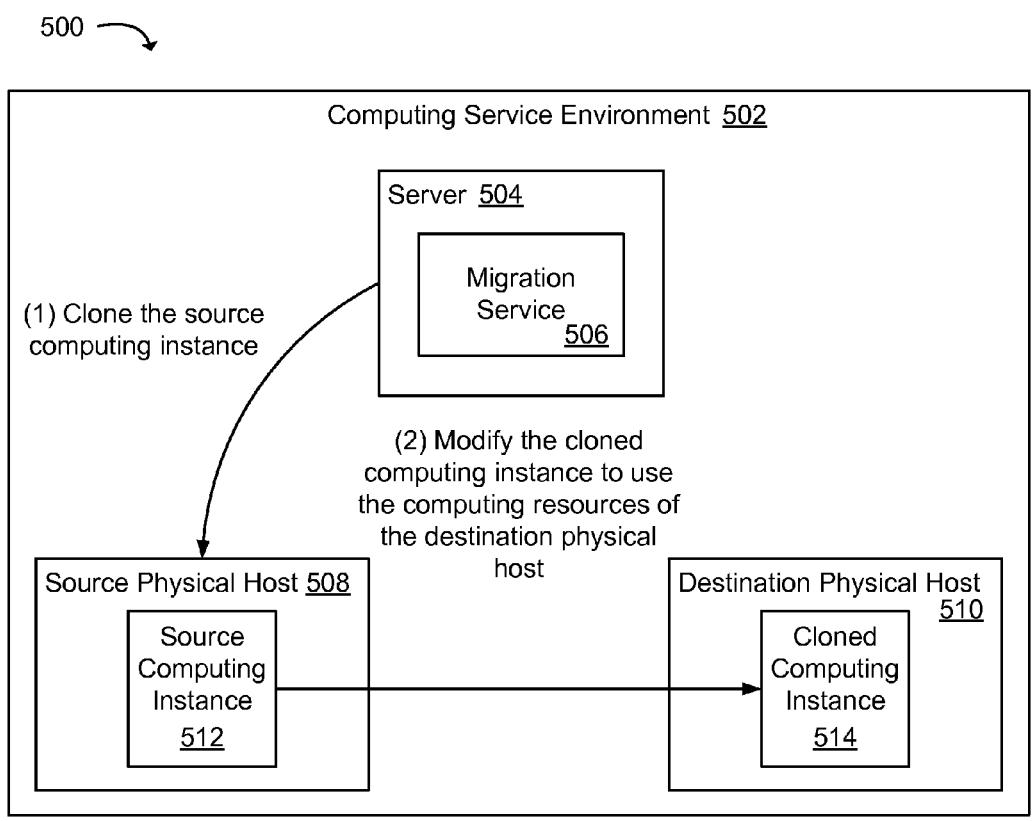
FIG. 5 is a block diagram that illustrates an example system for cloning a source computing instance and modifying the cloned computing instance to use the computing resources of a destination physical host.

FIG. 5 is a block diagram illustrating an example system and method 500 for cloning a source computing instance 512 and modifying the cloned computing instance 514 to use the computing resources of a destination physical host 510 when conflicts exist that may otherwise prevent the destination physical host 510 from hosting a computing instance modeled on the source computing instance 512. The system may include a computing service environment 502 having a server 504 containing a migration service 506 used to identify a destination physical host 510 used for a source computing instance 512 migration.

In determining that one or more conflicts exist that prevent the destination physical host 510 from hosting a computing instance modeled on the source computing instance 512 as described in relation to FIG. 4, the source computing instance (1) may be cloned (e.g., replicated). In one example, the cloned computing instance 514 may be created and transferred to the destination physical host 510, and in another example, the destination physical host 510 may receive instructions from the migration service 506 to clone the source computing instance 512 on the destination physical host 510.

After cloning the source computing instance 512, (2) the cloned computing instance 514 may be modified to utilize the computing resources of the destination physical host 510. As an illustration, the cloned computing instance 514 may be modified to use the system services of the destination physical host 510. As one specific example, the cloned computing instance 514 may be modified to use a newer or older version of a system service that may be available on the destination physical host 510 as compared to the version of the system service contained on the source physical host 508.

Figure 6:
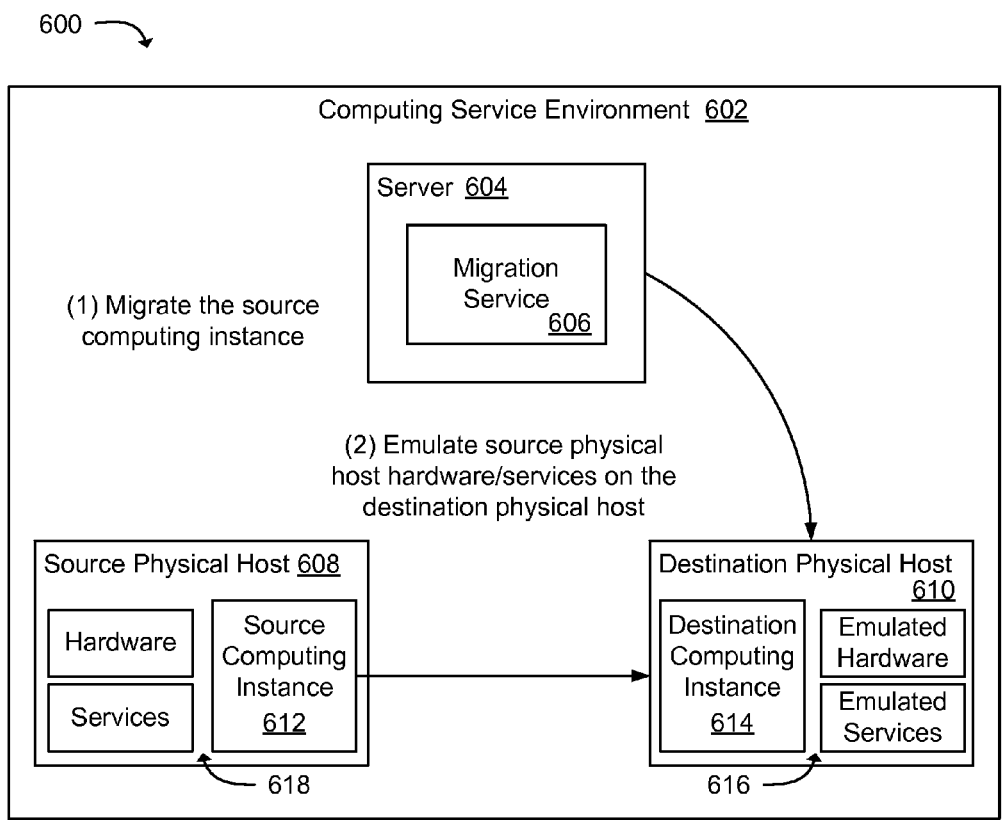
FIG. 6 is a block diagram that illustrates an example system for emulating computing resources on a destination physical host that may be used by a destination computing instance.

FIG. 6 is block diagram illustrating an example system and method 600 for emulating computing resources on a destination physical host 610 enabling the destination physical host 610 to host a destination computing instance 614 modeled on a source computing instance 612 as part of a migration of the source computing instance 612. As illustrated, the system may include a computing service environment 602 containing a server 604 that hosts a migration service 606.

In determining that one or more conflicts exist that prevent the destination physical host 610 from hosting a computing instance modeled on the source computing instance 612 (as described in relation to FIG. 4), computing resources 618 used by the source computing instance 612 available on a source physical host 608 may be emulated on the destination physical host 610. Illustratively, a determination may be made that computing resources 618 used by the source computing instance 612 scheduled for migration may be emulated on the destination physical host 610. For example, emulation software 616 for the computing resources 618 may be identified and a determination of whether the emulation software 616 may be compatible with the destination physical host 610 may be made.

In a case where emulation software 616 compatible with the destination physical host 610 may be identified, (1) the source computing instance 612 may be migrated. For example, the migration service 606 may be configured to instruct the destination physical host 610 to create a destination computing instance 614 modeled on the source computing instance 612. The destination physical host 610 may then be instructed to obtain the emulation software 616 and (2) emulate the source physical host's hardware and/or services using the emulation software 616.

Figure 7:
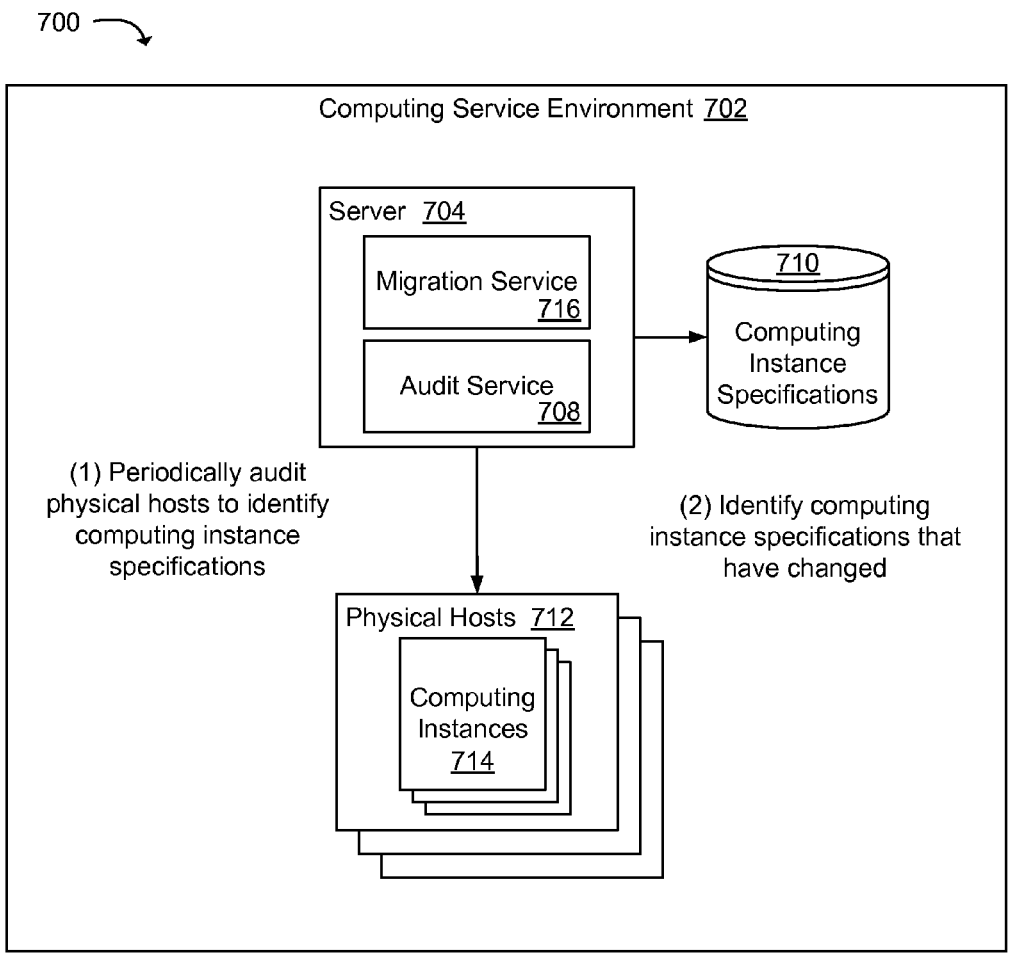
FIG. 7 is a block diagram that illustrates an example system for performing an audit of a computing service environment to determine specifications for computing instances included in the computing service environment.

FIG. 7 is a block diagram that illustrates an example system and method 700 for performing an audit of computing instances 714 included within a computing service environment 702 to determine specifications of the computing instances 714 in anticipation of migrating the computing instances 714. Although in general, specifications for a computing instance 714 may not change over the lifetime of the computing instance 714 while hosted on a physical host 712, modifications made by customers and/or computing service providers may result in complications in migrating the computing instance 714 to another physical host. Therefore, periodic audits of a computing service environment 702 may be performed to identify and inventory specifications for computing instances 714 included in the computing service environment 702. The results of the audits may be used in determining a computing instance 714 migration workflow.

As illustrated, a server 704 may host a migration service 716 as described earlier and an audit service 708 configured to identify specifications for computing instances 714 hosted by physical hosts 712 included as part of a computing service environment 702. For example, the audit service 708 may (1) periodically audit the physical hosts 712 to identify computing instance specifications for computing instances 714. The specifications for the computing instances 714 may be stored in a data store 710. As such, specifications for a computing instance 714 may be compared with stored specifications to (2) identify whether any of the specifications have changed since the last audit was performed.

In determining that specifications for a computing instance 714 have been modified, in one example, a notification may be provided to a computing service provider that includes information that the specifications for the computing instance 714 have been modified. The computing service provider may then use the information in relation to migrations of the computing instance 714. For example, the information may be used to create or alter migration workflows for the computing instance 714, alert a customer that the modification may not be supported when migrating the computing instance 714, as well as for other purposes related to migrating the computing instance 714.

In another example, a periodic audit of physical hosts 712 included in the computing service environment 702 may be performed to identify candidate physical hosts having available computing capacity that may be capable of hosting a computing instance 714 modeled on a source computing instance. The results of the audit may be used to match potential candidate physical hosts with computing instances 714 by referencing the specifications stored in the data store 710.

Figure 8A:
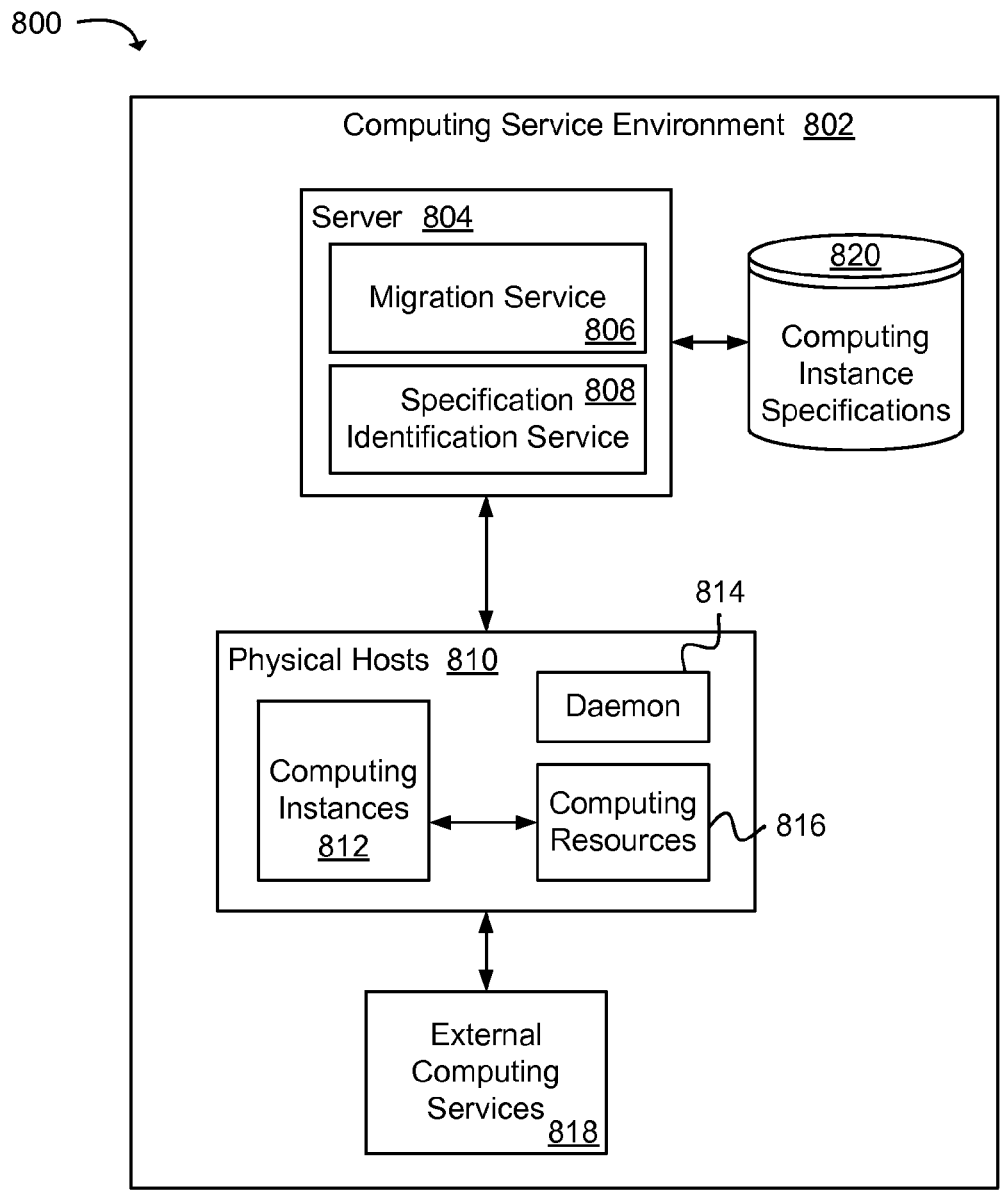
FIG. 8a is a block diagram illustrating an example system for identifying computing resources via a daemon located on a physical host.
Figure 8B:
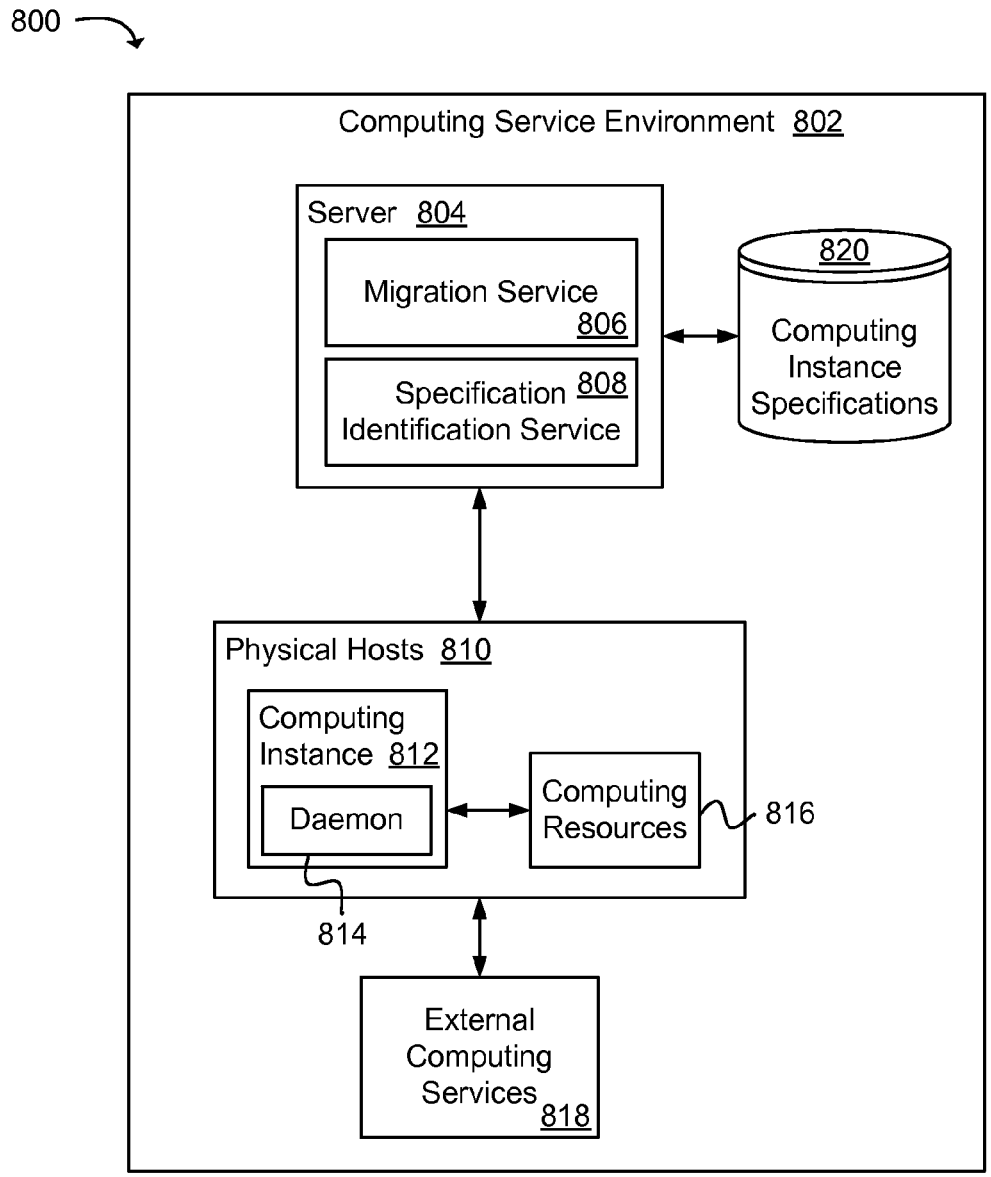
FIG. 8b is a block diagram that illustrates an example system for identifying computing resources via a daemon located on a computing instance.

FIG. 8a and FIG. 8b are block diagrams illustrating an example of a system 800 used for identifying specifications of a computing instance 812 by identifying computing resources 816 of a physical host 810 and/or external computing services 818 that may be utilized by the computing instance 812. The specifications identified for the computing instance 812 may be used to identify potential destination physical hosts in the event that the computing instance 812 is scheduled for migration. The system 800 may comprise a computing service environment 802 containing a server 804 that may be in communication with a number of physical hosts 810.

The server 804 may include a migration service 806 that performs the functions described earlier and a specification identification service 808 configured to identify specifications for a computing instance 812 using call tracing and/or software agents located on a computing instance 812, such as a daemon 814. In one example configuration, computing resources 816 for a physical host 810 used by a computing instance 812 may be identified by monitoring requests made by the computing instance 812 to the physical host 810 for the computing resources 816 (e.g., trace API calls made to various computing resources 816). For example, requests for computing resources 816 made by the computing instance 812 to a hypervisor may be monitored to determine which computing resources 816 (e.g., system services and hardware) the computing instance 812 may utilize. Based in part on utilization information gathered via tracing computing resource requests, specifications for the computing instance 812 may be identified and the computing instance specifications may be stored in a data store 820 making the computing instance specifications available to the migration service 806.

In another example configuration, as illustrated in FIG. 8a a daemon 814 may be installed on a physical host 810 that may provide specifications for a computing instance 812 to the specification identification service 808. The daemon 814 may be configured to periodically provide updated information for the specifications of a computing instance 812 thereby capturing changes that may be made to the computing instance 812.

In another example configuration, as illustrated in FIG. 8*b* a daemon 814 may be placed on an individual computing instance 812 such that the daemon 814 may be configured to provide specifications for the computing instance 812 to the specification identification service 808. The specifications provided by the daemon 814 may be used to identify a potential destination physical host in the event that the computing instance 812 may be scheduled for migration.

Figure 9:
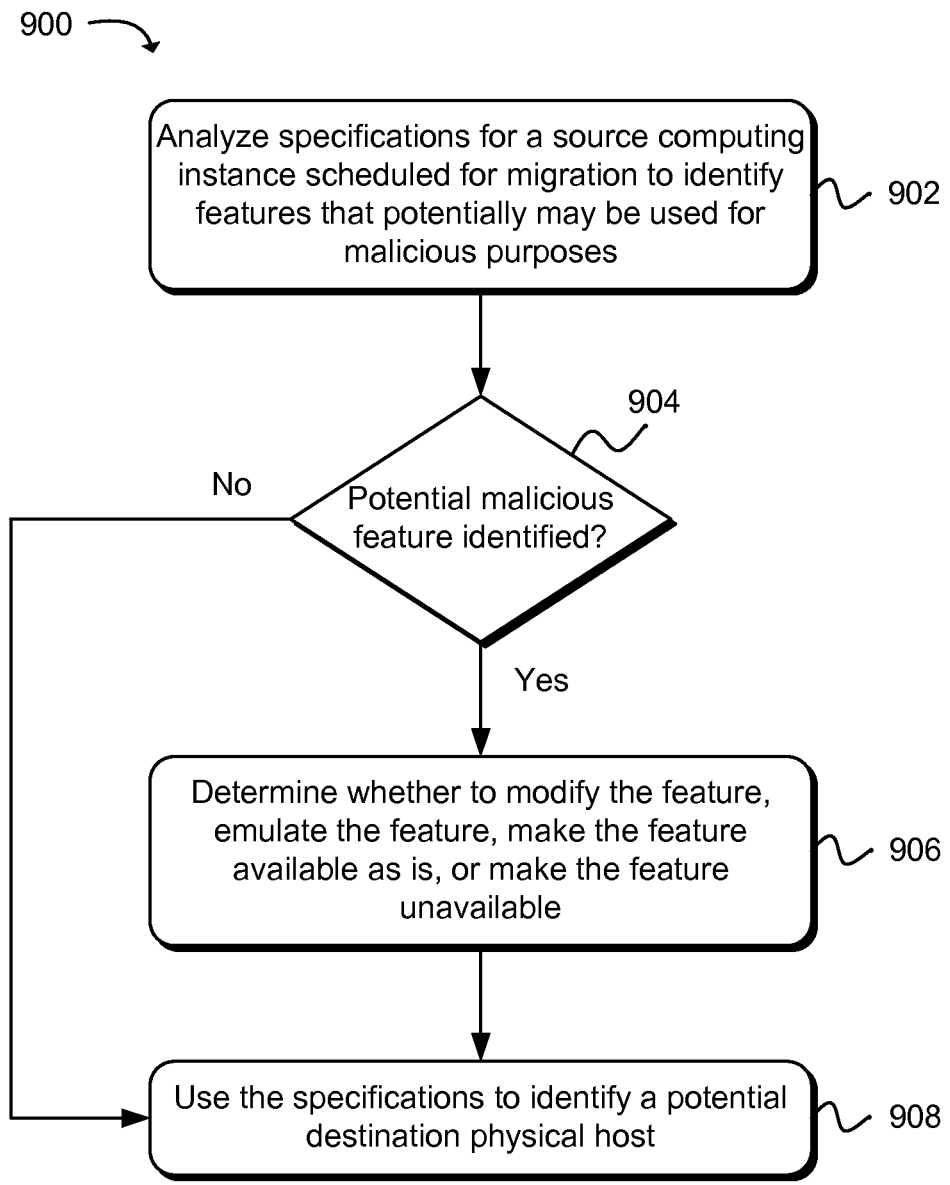
FIG. 9 is a flow diagram illustrating an example method for identifying features that can potentially be used for malicious purposes and determining whether to include the features in a destination computing instance.

FIG. 9 is a flow diagram illustrating an example of a method 900 for identifying specifications of a source computing instance scheduled for migration that may include features that can potentially be used for malicious purposes and determining whether to include the features in a destination computing instance. Beginning in block 902, specifications for a source computing instance scheduled for migration may be analyzed to identify features that may potentially be used for malicious purposes (e.g., disrupt computing service operations, collect sensitive information, gain access to private systems, etc.). For example, a machine image used to create a computing instance may include software that potentially could be used to undermine the security of a computing service environment, or the specifications of the computing instance may specify a system service included in a destination physical host that could potentially be used to undermine the security of the computing service environment.

As in block 904, a determination may be made that a feature poses a security threat to the computing service environment. In a case where a determination may be made that the feature does not pose a security threat, the specifications of the source computing instance may be used to identify a potential destination physical host, as in block 908.

In a case where the feature may pose a security threat, then as in block 906, a determination may be made whether to include the feature in a destination physical host or a destination computing instance. In one example, a determination may be made to include the feature in the destination physical host or destination computing instance as is. In other words, the feature as configured in the source physical host or source computing instance may be included in the computing instance specifications.

In another example, a determination may be made to modify the feature so that the feature does not pose a security risk to the computing service environment and include the modified feature in the computing instance specifications. In another example, a determination may be made to emulate the feature on a destination physical host so that the emulated feature does not pose a security risk. And in a further example, a determination may be made to not include the feature in the computing instance specifications. Having made a determination, the computing instance specifications may then be used to identify a potential destination physical host as in block 908.

In some examples, after allowing a feature having the potential to be used for malicious purposes to be included in a destination physical host, the destination physical host may be monitored to detect whether the feature is being used in accordance with a computing service environment policy. For example, usage patterns may be analyzed to determine how the feature is being used. In cases where the feature is being used inappropriately, access to the feature may be revoked by a computing service provider. Whereas usage patterns that show that the feature is being used appropriately may result in continued availability of the feature.

Figure 10:
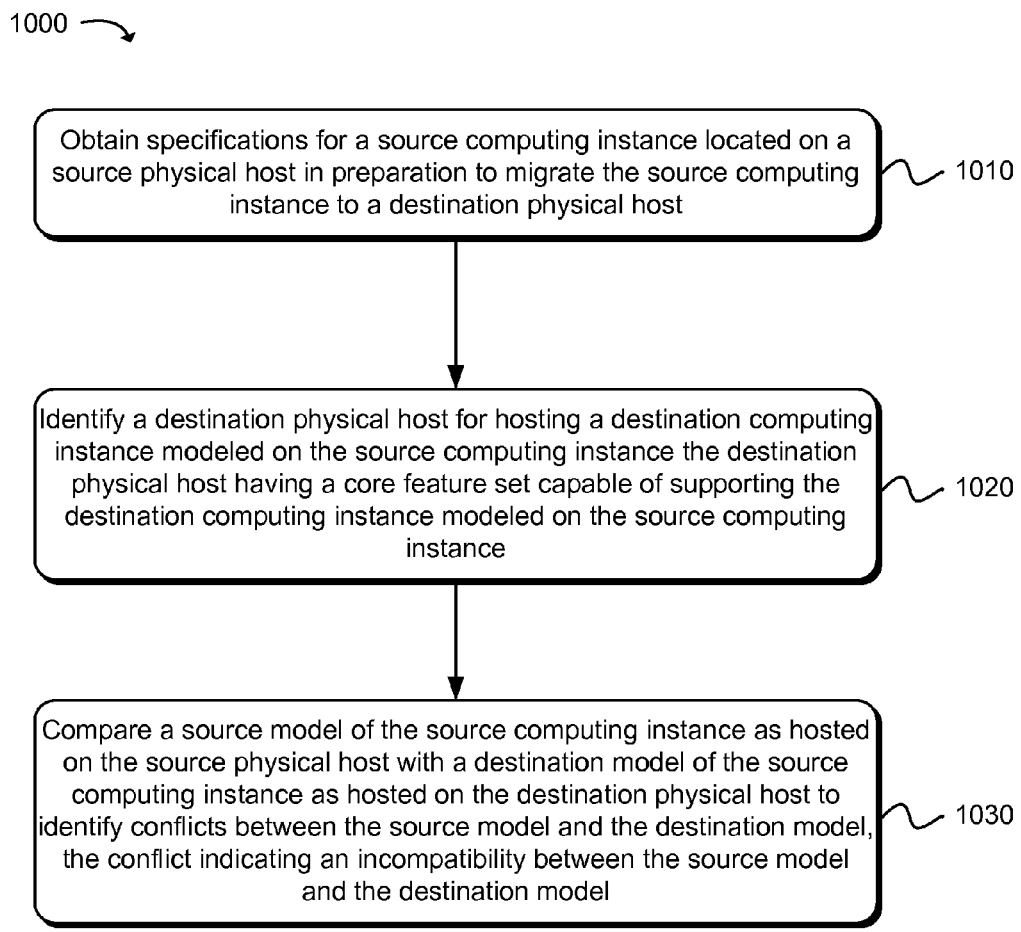
FIG. 10 is a flow diagram illustrating an example method for identifying a destination physical host that may be used to host a computing instance modeled on a source computing instance.

FIG. 10 is a flow diagram illustrating an example of a method 1000 for identifying a destination physical host that may be used to host a computing instance modeled on a source computing instance. Starting in block 1010, specifications for a source computing instance located on a source physical host may be obtained in preparation to migrate the source computing instance to a destination physical host. The specifications obtained for the source computing instance may be used to model the source computing instance as hosted on the destination physical host.

As in block 1020, a destination physical host may be identified for hosting a destination computing instance modeled on the source computing instance where the destination physical host may have a core feature set capable of supporting the destination computing instance modeled on the source computing instance. For example, the specifications for the source computing instance may be used to identify the destination physical host.

As in block 1030, a source model and a destination model may be compared to identify conflicts between the source model and the destination model where a conflict may indicate an incompatibility between the source model and the destination model. The source model may be a model of the source computing instance as hosted on the source physical host, and the destination model may be a model of the source computing instance as hosted on the destination physical host.

In a case where no conflicts are identified, a migration of the source computing instance may be performed. In a case where conflicts may have been identified, a filter may be applied to the conflicts to identify conflicts that may be inconsequential to the destination physical host being selected to host the destination computing instance. In the event that the conflicts may be identified as inconsequential, the destination physical host may be selected to host the destination computing instance.

Figure 11:
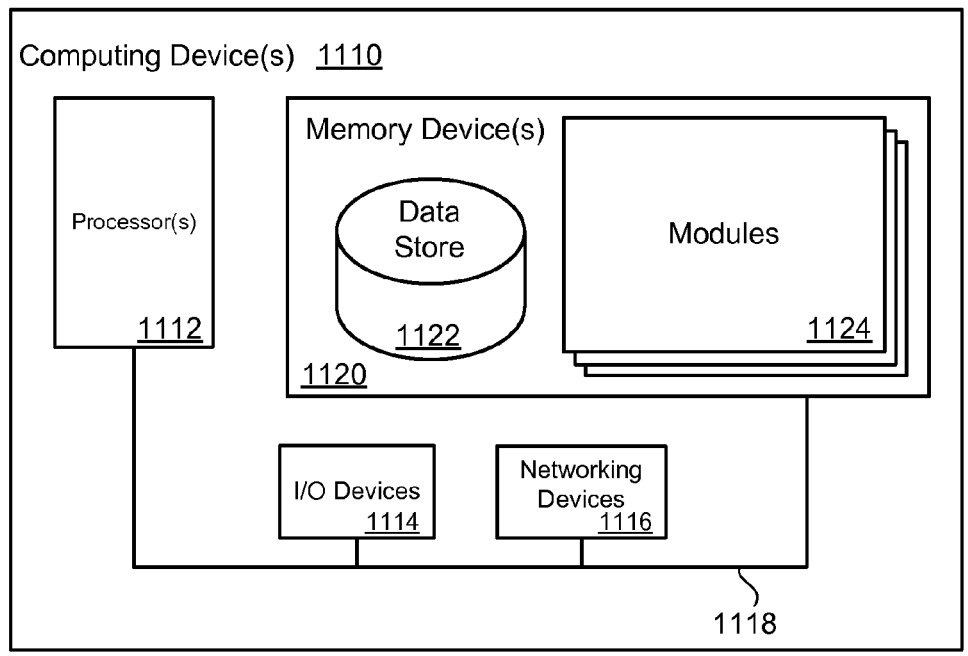
FIG. 11 is block diagram illustrating an example of a computing device that may be used to execute a method for identifying a destination physical host used as part of a computing instance migration.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device 1110 may include a local communication interface 1118 for the components in the computing device. For example, the local communication interface 1118 may be a local data bus and/or any related address or control busses as may be desired.

The memory device 1120 may contain modules 1124 that are executable by the processor(s) 1112 and data for the modules 1124. Examples of the modules 1124 may include a source specification module, a candidate identification module, a model generator, a candidate comparison module, conflict filter module and other modules that may be included in a migration service. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1120 may be executed by the processor(s) 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   obtain specifications for a source computing instance located on a source physical host in preparation to migrate the source computing instance to a destination physical host;
   identify candidate physical hosts as potential destination physical hosts for hosting a destination computing instance modeled on the source computing instance, the candidate physical hosts having a core feature set of hardware resources capable of supporting the destination computing instance modeled on the source computing instance;
   create a source model of the source computing instance as hosted on the source physical host using the specifications for the source computing instance that include source hardware specifications for the source physical host;
   create a destination model of the source computing instance to be hosted on a selected candidate physical host using the specifications for the source computing instance that include candidate hardware specifications for the candidate physical host;
   compare the source model with the destination model to identify conflicts between the source model and the destination model;
   determine that a conflict identified between the source model and the destination model is resolvable by emulating a computing resource of the source physical host used by the source computing instance on the candidate physical host; and
   select the candidate physical host as the destination physical host.

2. A non-transitory machine readable storage medium as in claim 1, wherein instructions that when executed by the processor further identify conflicts between the source model and the destination model that do not qualify as conflicts that prevent the candidate physical host from hosting the destination computing instance modeled on the source computing instance.

3. A non-transitory machine readable storage medium as in claim 1, wherein instructions that when executed by the processor further reject a candidate physical host as a result of identifying incompatible conflicts between the source model and the destination model.

4. A computer implemented method, comprising:
   obtaining specifications for a source computing instance located on a source physical host, using one or more processors of a computing system, in preparation to migrate the source computing instance to a destination physical host;
   identifying a computing resource of the source physical host used by the source computing instance that is capable of being emulated on a candidate physical host, using the one or more processors of the computing system;
   identifying a destination physical host for hosting a destination computing instance modeled on the source computing instance, using the one or more processors of the computing system, the destination physical host having a core feature set of hardware resources that are capable of supporting the destination computing instance modeled on the source computing instance and the destination physical host is capable of emulating the computing resource of the source physical host; and
   comparing a source model of the source computing instance as hosted on the source physical host with a destination model of the source computing instance as hosted on the destination physical host to identify a conflict between the source model and the destination model using the one or more processors of the computing system, the conflict indicating an incompatibility between the source model and the destination model that is resolvable by emulating the computing resource of the source physical host on the candidate physical host.

5. A method as in claim 4, further comprising creating the source model using specifications for the source computing instance and specifications for the source physical host; and
   creating the destination model using specifications for the source computing instance and specifications for the candidate physical host, wherein specifications used to create the source model and the destination model include software specifications and hardware specifications.

6. A method as in claim 4, further comprising performing a migration of the source computing instance as a result of a comparison of the source model and the destination model resulting in no conflicts that are not resolvable between the source model and the destination model.

7. A method as in claim 4, further comprising applying a filter to conflicts between the source model and the destination model, the filter identifying conflicts that are inconsequential to the destination physical host being selected to host the destination computing instance.

8. A method as in claim 4, further comprising replicating the source computing instance on the destination physical host and modifying the source computing instance to use computing resources of the destination physical host.

9. A method as in claim 4, further comprising replicating the source computing instance on the destination physical host and emulating source physical host computing resources used by the source computing instance on the destination physical host.

10. A method as in claim 4, further comprising modifying specifications of a migration workflow associated with the source computing instance to include modifications to the source computing instance to use computing resources of the destination physical host and emulations of source physical host computing resources used by the source computing instance.

11. A method as in claim 4, further comprising performing periodic audits of a computing service environment to identify and inventory specifications for computing instances included in the computing service environment.

12. A method as in claim 11, wherein performing the periodic audits of the computing service environment further comprises determining whether specifications for a computing instance have been modified and notifying a computing service provider that the specifications for the computing instance have been modified.

13. A method as in claim 4, further comprising performing a periodic audit of physical hosts included in a computing service environment to identify candidate physical hosts having available computing capacity and candidate physical hosts which are capable of hosting a computing instance modeled on the source computing instance.

14. A method as in claim 4, further comprising determining a cost associated with:
modifying computing resources of the destination physical host; and
emulating services on the destination physical host;
wherein the cost is: an amount of time to prepare the destination physical host, an amount of computing resources used to prepare the destination physical host or a monetary amount to purchase a destination physical host.

15. A method as in claim 4, further comprising determining a cost associated with modifying computing resources or emulating services for a plurality of candidate physical hosts and selecting a candidate physical host having a lowest cost to be the destination physical host.

16. A method as in claim 4, further comprising:
monitoring a status of a computing instance scheduled for migration where the migration includes modifying computing resources of the destination computing instance or the destination physical host; and
canceling performance of a modification to the computing resources of the destination computing instance or the destination physical host as a result of a termination of the computing instance scheduled for migration.

17. A method as in claim 4, further comprising performing the steps of claim 4 in anticipation of scheduling a migration of the source computing instance.

18. A system comprising:
a processor;
a memory device including instructions that, when executed by the processor, cause the system to:
analyze a source computing instance located on a source physical host to identify source computing instance specifications in preparation to migrate the source computing instance to a destination physical host;
analyze physical hosts to identify a candidate physical host as a possible host for hosting a destination computing instance modeled on the source computing instance, the candidate physical host having a core set of hardware resources determined to support the destination computing instance;
create a source model of the source computing instance as hosted on the source physical host using the source computing instance specifications and source physical host specifications;
create a destination model of the source computing instance as hosted on a selected candidate physical host using the source computing instance specifications and the core set of hardware resources of the candidate physical host; and
compare the source model with the destination model to identify conflicts between the source model and the destination model indicating incompatibilities that are resolvable by emulating computing resources of the source physical host on the candidate physical host; and
reconcile the conflicts between the source model and the destination model resulting in migrating the source computing instance to the destination physical host.

19. A system as in claim 18, wherein the memory device includes instructions that, when executed by the processor, causes the system to reconcile conflicts between the source model and the destination model by:
identifying conflicts between the source model and the destination model that do not qualify as conflicts that prevent the candidate physical host from hosting the destination computing instance modeled on the source computing instance, or
replicating the source computing instance on the destination physical host and modifying the source computing instance to use computing resources of the destination physical host, or
emulating source physical host computing resources used by the source computing instance on the destination physical host.

20. A system as in claim 18, wherein the memory device includes instructions that, when executed by the processor, causes the system to further identify computing resources for the source physical host that are used by the source computing instance, wherein the computing resources are identified by requests made by the source computing instance to the source physical host for the computing resources.

21. A system as in claim 18, wherein the memory device includes instructions that, when executed by the processor, causes the system to analyze the source computing instance located on the source physical host to identify the source computing instance specifications via a software agent located on the source computing instance that identifies and returns the source computing instance specifications.

22. A system as in claim 18, wherein the memory device includes instructions that, when executed by the processor, causes the system to further analyze features of a machine image used to create the source computing instance to identify features that are potentially used to attack the system and determine whether to include the features in the destination physical host.

* * * * *